UNITED STATES PATENT OFFICE.

ALBERT HENDRIK VAN DER VYGH, HENDRIK VAN DER VYGH, AND GERHARD VAN DER VYGH, OF AMSTERDAM, NETHERLANDS.

COMPOSITION OF MATTER FOR FIREPROOF WALL-PLATES, &c.

SPECIFICATION forming part of Letters Patent No. 597,129, dated January 11, 1898.

Application filed February 1, 1897. Serial No. 621,548. (No specimens.)

*To all whom it may concern:*

Be it known that we, ALBERT HENDRIK VAN DER VYGH, residing at No. 4 Bosboom Toussaint Street, and HENDRIK VAN DER VYGH and GERHARD VAN DER VYGH, residing at No. 2 Bosboom Toussaint Street, Amsterdam, Netherlands, subjects of the Queen of the Netherlands, have invented a new and useful Composition of Matter to be Used for the Manufacture of Fireproof Wall-Plates and Fireproof Ceiling-Plates, of which the following is a specification.

Our improved fireproof composition consists of the following ingredients—that is to say, coke-dust, lime, tan, and any good ordinary plaster and water. These are combined in the manner hereinafter stated. For the manufacture of wall-plates such ingredients are combined in the following proportions, viz: coke-dust, thirty-two per cent. by bulk; lime, sixteen per cent. by bulk; tan, thirteen per cent. by bulk; plaster, twenty-one per cent. by bulk; water, eighteen per cent. by bulk. These ingredients in these proportions are thoroughly mingled by agitation, and the composition so formed is then run into frames of any convenient form and dimensions, wherein it is allowed to set, and when it is thoroughly set the frame is removed, leaving the wall-plate ready for immediate use. A convenient thickness for wall-plates is fifty-two millimeters. Such wall-plates may be stored for any length of time.

For the manufacture of ceiling-plates the ingredients are combined in the following proportions, viz: coke-dust, fifteen per cent. by bulk; lime, ten per cent. by bulk; tan, twenty-four per cent. by bulk; plaster, twenty-eight per cent. by bulk; water, twenty-three per cent. by bulk. The composition formed by the mixture of the ingredients in these proportions is run into frames similar to those used for wall-plates, so as to produce thinner and larger plates. When the composition is thoroughly set, the frame is removed and the plate is ready for use.

A convenient thickness for ceiling-plates is fifteen millimeters, which will be found sufficient even when there are center-flowers and other heavy decorations.

The wall and ceiling plates may, however, be made of any desired shape, size, and thickness, the form and dimensions of the frame being varied to meet requirements, while in every case the thickness of the plate is regulated by the depth of the frame.

Our improved fireproof composition possesses the following advantages, viz:

First. It is light in weight, being only nine hundred kilograms the cubic meter.

Second. It is far cheaper than any other artificial fireproof stone owing to coke-dust and tan being waste products.

Third. It is easily worked and can be sawed, nailed, or screwed as readily as wood.

Fourth. It allows of building operations being carried on at any season, as, owing to its being perfectly dry, it is unaffected either by wet or frost.

Fifth. It can be stuccoed without being previously wetted, and in a few days is fit either for painting or papering.

Sixth. It does not harbor insects or vermin.

Seventh. In addition to being fireproof it is impervious to sound, heat, and cold. It is therefore particularly adapted for building both division and external walls, ceilings, floors, vaults, factories, warehouses, barracks, banks, offices, and other public and private buildings.

We are aware that lime, plaster, and water have been used in the manufacture of artificial stone; but we are not aware that all of the ingredients of our composition in the proportions stated have been used together.

What we claim, and desire to secure by Letters Patent of the United States, is—

The new and useful composition of matter for the manufacture of fireproof wall-plates and ceiling-plates consisting of coke-dust, lime, tan, plaster and water combined in about the proportions hereinbefore specified.

ALBERT HENDRIK VAN DER VYGH.
   HENDRIK VAN DER VYGH.
   GERHARD VAN DER VYGH.

Witnesses:
 FREDERIK CARL KRAAY,
 HEINRICH PIETER GEVERS.